US009541076B1

(12) United States Patent
Weiss et al.

(10) Patent No.: US 9,541,076 B1
(45) Date of Patent: Jan. 10, 2017

(54) FLUID DELIVERY DEVICE FOR KILLING WEEDS

(71) Applicants: John Weiss, Golden, CO (US); Patrick Auell, Morrison, CO (US); Shawn Stokes, Golden, CO (US)

(72) Inventors: John Weiss, Golden, CO (US); Patrick Auell, Morrison, CO (US); Shawn Stokes, Golden, CO (US)

( * ) Notice: Subject to any disclaimer, the term of this patent is extended or adjusted under 35 U.S.C. 154(b) by 0 days.

(21) Appl. No.: 14/677,800

(22) Filed: Apr. 2, 2015

(51) Int. Cl.
| *A01M 21/00* | (2006.01) |
| *A01C 23/02* | (2006.01) |
| *F04B 19/04* | (2006.01) |
| *F04B 7/02* | (2006.01) |
| *F04B 9/02* | (2006.01) |
| *F04B 19/22* | (2006.01) |
| *F04B 23/02* | (2006.01) |
| *F04B 53/10* | (2006.01) |
| *A01G 3/00* | (2006.01) |
| *A01M 7/00* | (2006.01) |

(52) U.S. Cl.
CPC .............. *F04B 19/04* (2013.01); *A01C 23/02* (2013.01); *A01G 3/00* (2013.01); *A01M 7/00* (2013.01); *A01M 21/00* (2013.01); *F04B 7/02* (2013.01); *F04B 9/02* (2013.01); *F04B 19/22* (2013.01); *F04B 23/02* (2013.01); *F04B 53/10* (2013.01)

(58) Field of Classification Search
CPC .. A01C 23/02; A01G 2003/007; A01M 21/00; A01M 7/0025; A01M 7/0064; F04B 19/04; F04B 7/02; F04B 9/02; F04B 19/22; F04B 23/02; F04B 53/10

USPC .............. 401/109, 198; 111/7.1–7.3; 47/57.5; 239/375, 532

See application file for complete search history.

(56) References Cited

U.S. PATENT DOCUMENTS

| 951,760 | A | | 3/1910 | Foulke et al. | |
| 1,135,346 | A | * | 4/1915 | Barnhart | A01M 21/043 111/7.3 |
| 1,772,763 | A | * | 8/1930 | Riper | A01M 21/043 111/7.3 |
| 1,868,235 | A | * | 7/1932 | Jaden | A01M 17/002 111/7.3 |
| 1,890,301 | A | | 12/1932 | Oakes | |
| 1,939,897 | A | | 12/1933 | Hill | |
| 2,222,235 | A | | 11/1940 | Nelson | |
| 2,577,687 | A | * | 12/1951 | Lee | A01M 21/043 111/7.3 |

(Continued)

OTHER PUBLICATIONS

NatureZap.com Broadleaf Weed Killer, retrieved from naturezap.com on Apr. 1, 2015. 2 pages.

(Continued)

*Primary Examiner* — John G Weiss
(74) *Attorney, Agent, or Firm* — Perkins Coie LLP

(57) ABSTRACT

A liquid delivery device for killing weeds. The liquid delivery device includes a main tube, a handle, and a pump housing that includes a pump chamber. A reservoir is disposed in the main tube, and a plunger is connected to the reservoir and positioned in the pump chamber. The plunger is operative to push a liquid contained in the pump chamber through a check valve and dispensing orifices when a user moves the reservoir with respect to the main tube and pump housing. The device also includes a spike extending from the pump housing and an annular stand-off surrounding the spike. The spike is adapted to disrupt the soil and damage the root structure of a target weed.

18 Claims, 16 Drawing Sheets

(56) References Cited

U.S. PATENT DOCUMENTS

| | | | | |
|---|---|---|---|---|
| 2,659,918 A | * | 11/1953 | Stoner | A01M 21/043 |
| | | | | 111/7.3 |
| 2,703,192 A | | 3/1955 | Lunn et al. | |
| 2,817,189 A | * | 12/1957 | Esmay | A01M 21/043 |
| | | | | 111/7.3 |
| 2,841,923 A | * | 7/1958 | Dickison | A01M 21/043 |
| | | | | 111/7.1 |
| 2,867,943 A | * | 1/1959 | Whitesell | A01G 7/06 |
| | | | | 111/7.2 |
| 2,874,658 A | | 2/1959 | Jarnette et al. | |
| 2,885,121 A | | 5/1959 | Littleton | |
| 3,096,534 A | | 7/1963 | Jones | |
| 3,346,194 A | | 10/1967 | Enblom | |
| 3,399,639 A | | 9/1968 | Enblom | |
| 5,216,833 A | | 6/1993 | Longer | |
| 5,555,673 A | * | 9/1996 | Smith | B05C 17/002 |
| | | | | 118/270 |
| 6,367,714 B1 | * | 4/2002 | Smoot | A01M 21/043 |
| | | | | 239/288 |
| 7,770,529 B2 | * | 8/2010 | Phillips, Jr. | B65B 3/32 |
| | | | | 111/127 |
| 7,946,511 B2 | * | 5/2011 | Ballu | A01M 7/0046 |
| | | | | 111/7.2 |
| 8,438,778 B2 | | 5/2013 | Rose | |
| 8,567,116 B1 | | 10/2013 | Hall | |
| 8,998,524 B2 | * | 4/2015 | Shoaf | A01M 21/043 |
| | | | | 401/117 |

OTHER PUBLICATIONS

TeraGrow Inc. Products, retrieved from www.teragro.com/English/Home%20Page.htm on Apr. 1, 2015. 1 page.

\* cited by examiner

FLUID DELIVERY DEVICE FOR KILLING WEEDS

TECHNICAL FIELD

This patent application is directed to weed killing tools, more specifically, to fluid delivery devices for delivering fluids, such as herbicides, to leaves and/or root structures of a target weed or plant.

BACKGROUND

Weed control has been a challenge for at least as long as people have maintained lawns. Generally, chemical weed killers or herbicides are used to control weeds. Non-selective herbicides, such as Round-Up®, are very effective. However, they are notorious for killing desirable plants, particularly lawn grass. Selective herbicides, although designed to target specific weeds, are generally less potent than non-selective herbicides. Many people prefer to use natural rather than synthetic herbicides. However, natural herbicides tend to be non-selective. Therefore, when using any of the selective, non-selective, and natural herbicides, it is important to specifically target the weed and control overspray. Most herbicides are applied with a simple spray bottle or wiper, neither of which can both control overspray and adequately target the weed's leaf and root structures.

SUMMARY

Provided herein is a liquid delivery device. The liquid delivery device is suited for application of weed killer to weeds, but may be used for the delivery of other liquids. Additionally, although described in relation to a liquid delivery, the technology described herein is applicable to gases (e.g., liquids, slurry, pastes, and gases—in other words fluids) as well. Thus, the term liquid should not be used in a limiting sense. In an embodiment, the liquid delivery device includes a main tube and a pump attached to the main tube that includes a pump housing and a pump chamber. The device also includes a check valve including one or more dispensing orifices in fluid communication with the pump chamber. A reservoir is disposed at least partially within the main tube for reciprocating movement therein, and a plunger is connected to the reservoir and positioned in the pump chamber. The plunger is operative to push a liquid contained in the pump chamber through the check valve and dispensing orifices upon reciprocating movement of the reservoir.

In some embodiments, the pump housing extends along an elongate axis and further comprises a spike extending axially from the pump housing. In some embodiments, the device further comprises a stand-off extending from the pump housing and positioned to space the dispensing orifices from a surface. In some embodiments, the stand-off comprises an annular ring. In some embodiments, the annular ring includes one or more notches having at least one sharp edge capable of cutting the leaves of a weed. In some embodiments, the pump housing includes a check valve cavity, and the check valve comprises a check ball and a check ball spring contained in the check valve cavity. In some embodiments, the device further comprises a check valve retainer attached to the pump housing adjacent the check valve cavity and including one or more dispensing orifices.

In another representative embodiment, the liquid delivery device includes a main tube and a reservoir disposed at least partially within the main tube for reciprocating movement therein. A pump is attached to the main tube. The pump includes a pump housing extending along an axis that includes a pump chamber, a plunger connected to the reservoir and positioned in the pump chamber, a plunger valve connected to the plunger, and a check valve in fluid communication with the pump chamber. The movement of the reservoir tube causes the plunger to push a liquid contained in the pump chamber through the check valve. The device also includes a spike extending axially from the pump housing.

In some embodiments, the plunger reciprocates between a pumping direction and a recharge direction, wherein the plunger valve is operative to seal against a face of the plunger when moving in the pumping direction and operative to uncover a supply opening when moving in the recharge direction, thereby filling the pump chamber with the liquid from the reservoir. In some embodiments, the device further comprises a stand-off extending from the pump housing and positioned to space the check valve from a surface. In some embodiments, the reservoir includes a removable cap to facilitate refilling the reservoir. In other embodiments, the reservoir is a replaceable cartridge including a plunger opening for removably receiving a connector end of the plunger. In some embodiments, the cartridge includes a frangible seal (e.g., foil) positioned proximate the plunger opening, and the connector end includes a protrusion operative to breech the frangible seal when the connector end is inserted into the plunger opening.

In a further representative embodiment, the liquid delivery device includes a main tube having proximal and distal end portions, a handle disposed on the proximal end portion of the main tube, and a reservoir disposed at least partially within the main tube for reciprocating movement therein. A pump is attached to the distal end portion of the main tube. The pump includes a pump housing including a pump chamber, a plunger connected to a first end of the reservoir and positioned in the pump chamber, and a check valve in fluid communication with the pump chamber. Movement of the reservoir tube causes the plunger to push a liquid contained in the pump chamber through the check valve. The device also includes a spike extending from the pump housing and a stand-off extending from the pump housing and positioned adjacent the spike.

In some embodiments, a second end of the reservoir extends beyond the proximal end of the main tube, whereby a user can move the reservoir and plunger in a pumping direction by pushing on the second end of the reservoir. In some embodiments, the device further comprises a return spring positioned between the plunger and pump housing operative to urge the plunger and reservoir in a recharge direction. In some embodiments, the device further comprises a plunger valve connected to the plunger, wherein the plunger valve is operative to seal against a face of the plunger when moving in the pumping direction and operative to uncover a supply opening when moving in the recharge direction, thereby filling the pump chamber with the liquid from the reservoir. In some embodiments, the stand-off comprises an annular ring. In some embodiments, the annular ring includes one or more notches having at least one sharp edge capable of cutting the leaves of a weed.

These and other aspects of the disclosed technology will be apparent after consideration of the Detailed Description and figures herein. It is to be understood, however, that the scope of the invention shall be determined by the claims as issued and not by whether the given subject matter addresses any or all issues noted in the background or includes any features or aspects recited in this summary.

BRIEF DESCRIPTION OF THE DRAWINGS

The liquid delivery devices introduced here may be better understood by referring to the following Detailed Description in conjunction with the accompanying drawings, in which like reference numerals indicate identical or functionally similar elements.

Figure 1:
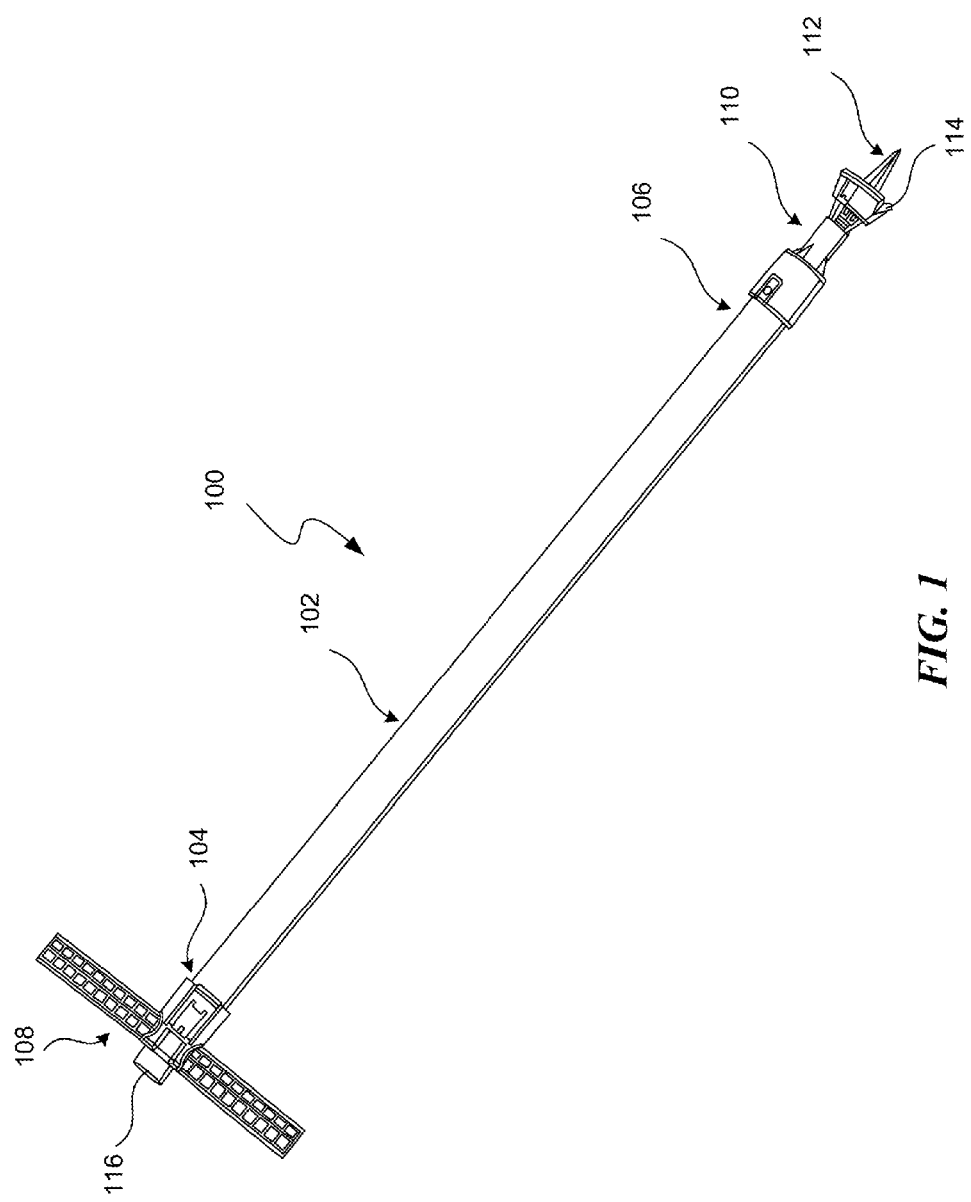
FIG. 1 is a perspective view illustrating a liquid delivery device according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

Provided herein is a liquid delivery device for killing weeds. In an embodiment, the liquid delivery device includes a main tube, a handle, and a pump attached to the main tube. The pump includes a pump housing and a pump chamber. A reservoir is disposed within the main tube for reciprocating movement therein, and a plunger is connected to the reservoir and positioned in the pump chamber. The plunger is operative to push a liquid contained in the pump chamber through a check valve and dispensing orifices when a user moves the reservoir with respect to the main tube and pump housing. In some embodiments, the device also includes a spike extending axially from the pump housing and an annular stand-off surrounding the spike. The spike is adapted to disrupt the soil and damage the root structure of a target weed. Accordingly, herbicide can be dispensed directly onto the root structure, thereby increasing the effectiveness of natural herbicides. The stand-off prevents dirt from clogging the dispensing orifices, but also provides a shroud that contains the dispensed herbicide, thereby controlling overspray which can kill desirable plants surrounding the target weed.

GENERAL DESCRIPTION

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 2:
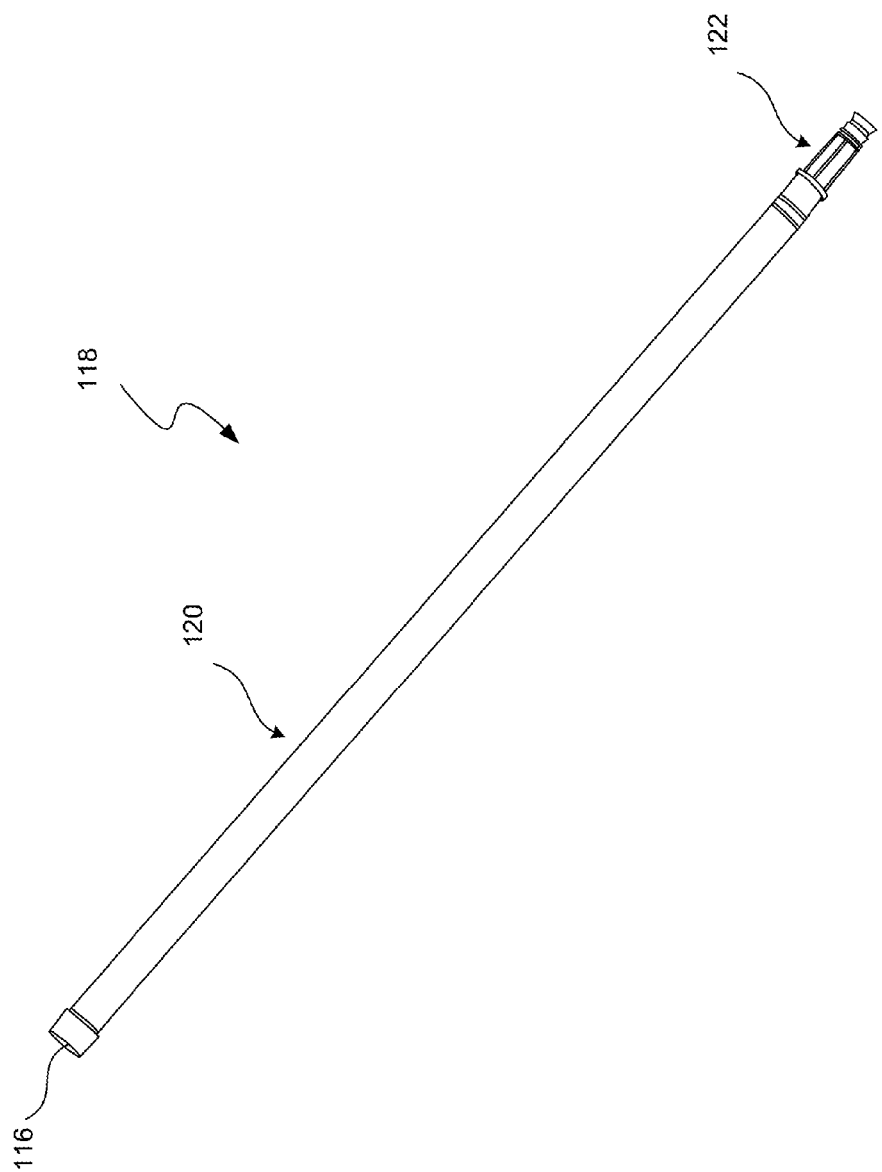
FIG. 2 is a perspective view of a reservoir used in the liquid delivery device shown in FIG. 1.

The liquid delivery device 100, shown in FIG. 1, includes a main tube 102 having a proximal end portion 104 and a distal end portion 106. A handle 108 is disposed on proximal end portion 104, and a pump is disposed on distal end portion 106, where the pump comprises a pump housing 110 as shown. Liquid delivery device 100 also includes a spike 112 and one or more cutting features 114 disposed on pump housing 110. Spike 112 and cutting feature 114 are operative to damage the roots and/or other parts of the plant, such as, for example, leaves of a weed, such as a dandelion, when handle 108 is rotated back and forth by a user. Once the root and/or other parts of the plant of the target weed are damaged, a user can dispense a liquid, such as a suitable weed killer or herbicide, onto the weed by pressing reservoir cap 116. For completeness, the weed killer may be at least partially absorbed through the damaged root and/or other parts of the plant. As shown in FIG. 2, reservoir assembly 118 includes a reservoir 120, a reservoir cap 116, and a plunger 122.

Figure 3:
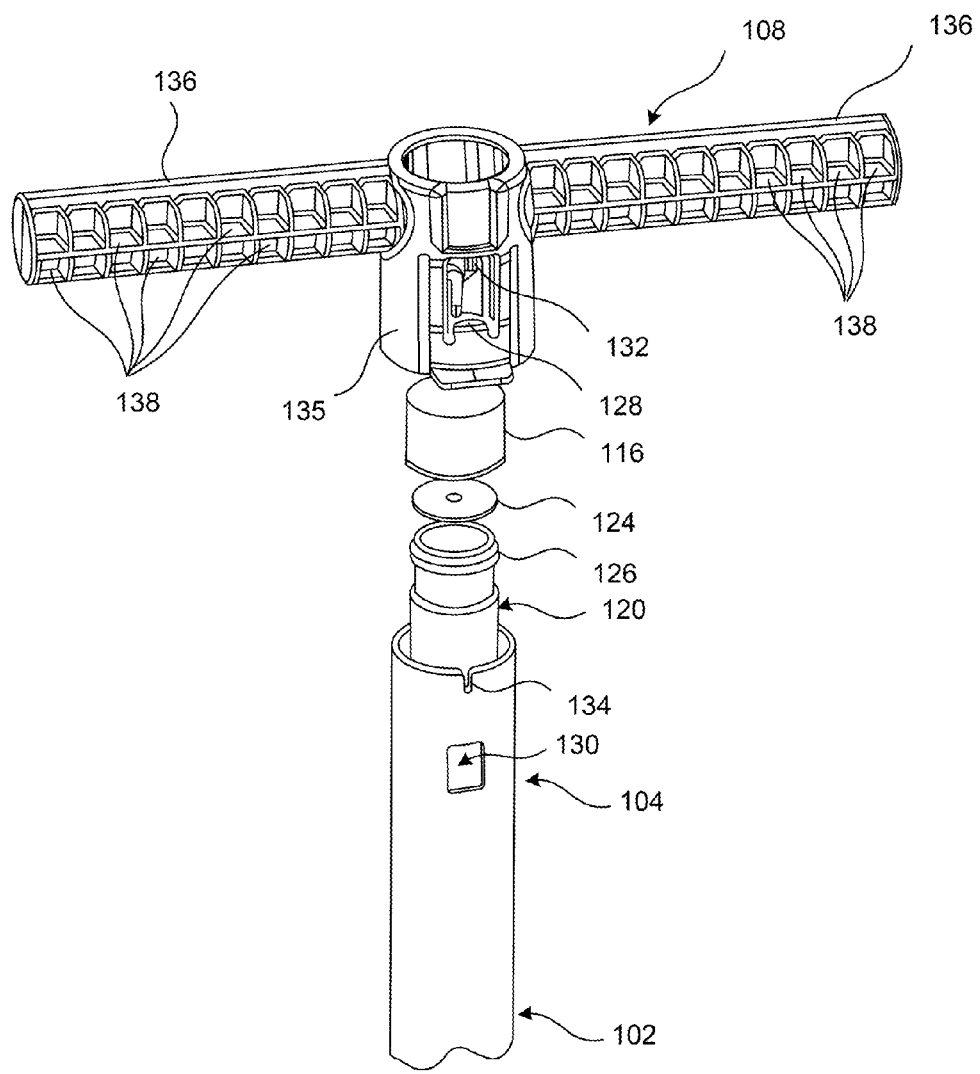
FIG. 3 is an exploded partial perspective view of the handle shown in FIG. 1.

With reference to FIG. 3, it can be appreciated that reservoir cap 116 is screwed on to reservoir 120 with threads 126. Reservoir cap 116 is sealed against reservoir 120 with a vented cap liner 124. In some embodiments, the reservoir cap can include a one-way check valve or other suitable breathable cap (e.g., vacuum breaker) to allow air to enter the reservoir when liquid is being pumped out. Handle 108 is attached to main tube 102 by locking tabs 128 that engage locking apertures 130. Indexing tab 132 engages mating index notch 134 to locate the handle 108 with respect to main tube 102. The locking tab 128 and indexing tab 132 help to prevent rotation between handle 108 and main tube 102. In other embodiments, the handle is configured to thread or screw onto an end portion of the main tube.

Figure 4:
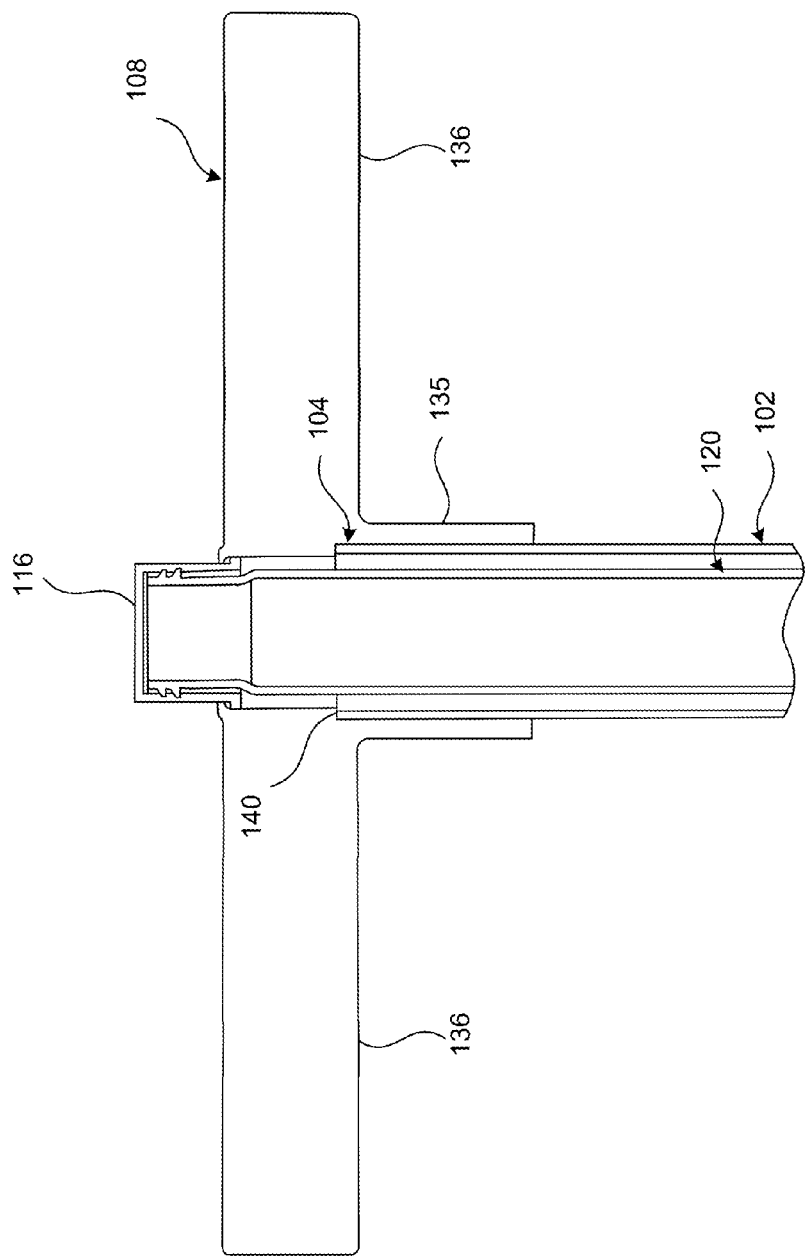
FIG. 4 is a partial side view and cross-section of the handle shown in FIGS. 1 and 3.

Handle 108 includes grip portions 136 that extend laterally from grip fitting 135. In some embodiments, the grip portions 136 can include an array of cut-outs or reliefs to provide a gripping surface. In addition, reliefs 138 reduce the amount of plastic required to mold the handle 108. With further reference to FIG. 4, reservoir 120 and reservoir cap 116 both extend through fitting 135 of handle 108. Main tube 102 extends into handle fitting 135 and abuts a ledge 140 formed in handle fitting 135, thereby axially locating the main tube 102 within handle 108/handle fitting 135. In certain embodiments, the handle fitting 135 and main tube 102 may be a single molded, printed, or machined piece.

Figure 5:
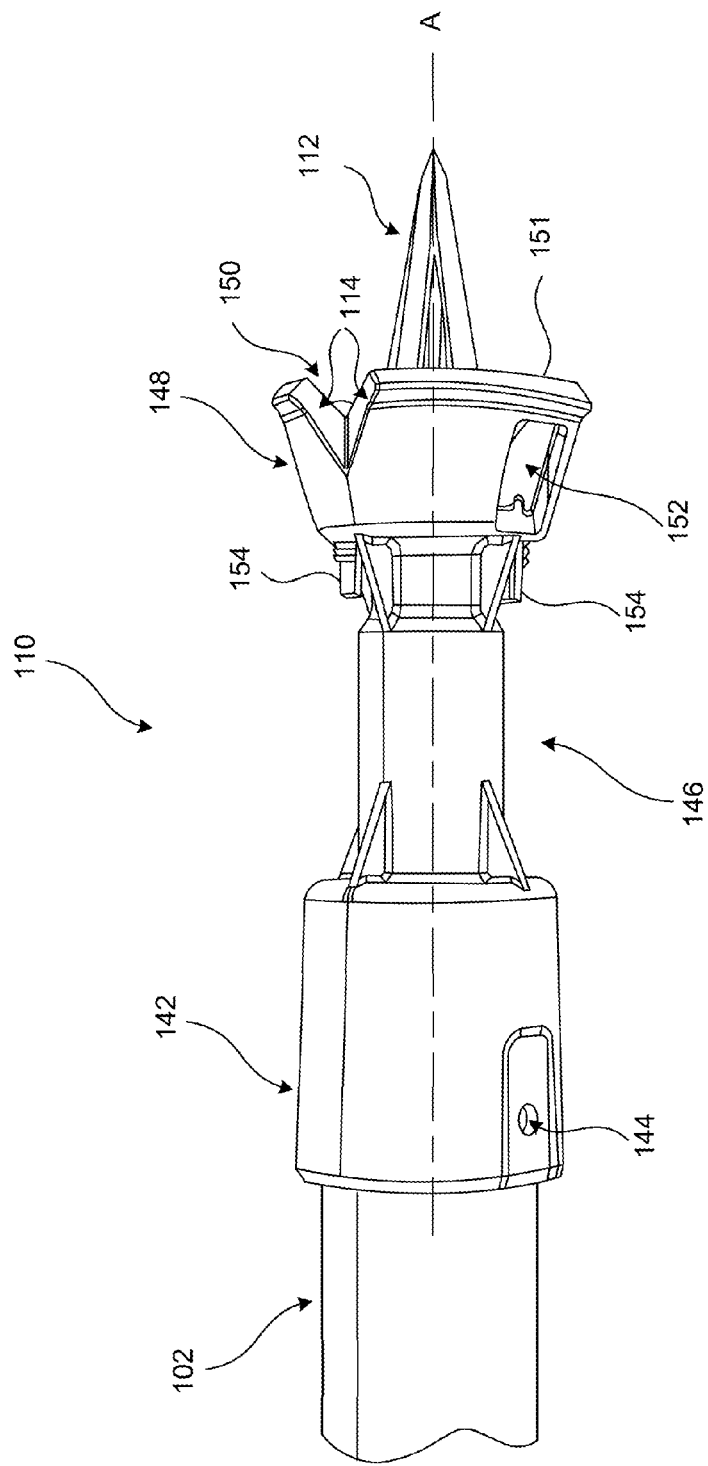
FIG. 5 is a perspective view of the pump housing shown in FIG. 1.

As shown in FIG. 5, pump housing 110 includes a fitting portion 142 configured to receive main tube 102. Fitting portion 142 includes fastening aperture 144 sized to receive a suitable fastener to retain main tube 102 in the fitting portion 142. In certain embodiments, the pump housing 110 and the main tube 102 may be a single molded, printed, or machined piece. Pump housing 110 also includes a pump portion 146 extending from fitting portion 142.

In this embodiment, pump housing 110 also includes a stand-off 148 extending from pump portion 146. In some embodiments, the stand-off 148 is in the form of an annular ring extending from the pump portion 146. In this particular exemplary embodiment, the stand-off 148 is provided with a bell or frustoconical shape. Stand-off 148 includes a sharp edge 151 at the base of the annular ring that damages and cuts the leaves of a target weed. Stand-off 148 also includes a plurality of cutting features 114 around its circumference. In this case, cutting features 114 are in the form of a notch cut into the annular ring of stand-off 148. Notch 150 is formed such that the edges of the notch are sharp, thereby creating cutting features 114. Cutting features 114 are operative to damage the leaves, or in certain applications, the root of a weed. In addition, stand-off 148 acts as a shield or shroud to help contain dispensed weed killer (or other fluid). In some embodiments, stand-off 148 includes one or more clean out windows 152 to facilitate cleaning debris, such as soil and vegetation, from the tool. Clean out windows 152 also allow a user to better see the weed as the spike 112 lined up with the weed. Although the embodiments shown and described herein include a stand-off 148 having an annular ring extending the full circumference of the pump housing 110, other suitable stand-off structures can be used. For example, a half circumference ring could be used.

Liquid delivery device 100 generally extends along an elongate axis A. It can be appreciated from the figures that the pump housing 110, the main tube 102, the reservoir 120, and handle fitting 135 are all concentrically assembled to each other and, therefore, all extend along axis A. Also shown in FIG. 5, spike 112 is attached to pump housing 110 by a plurality of latches 154. Accordingly, spike 112 is removable and replaceable.

Figure 6:
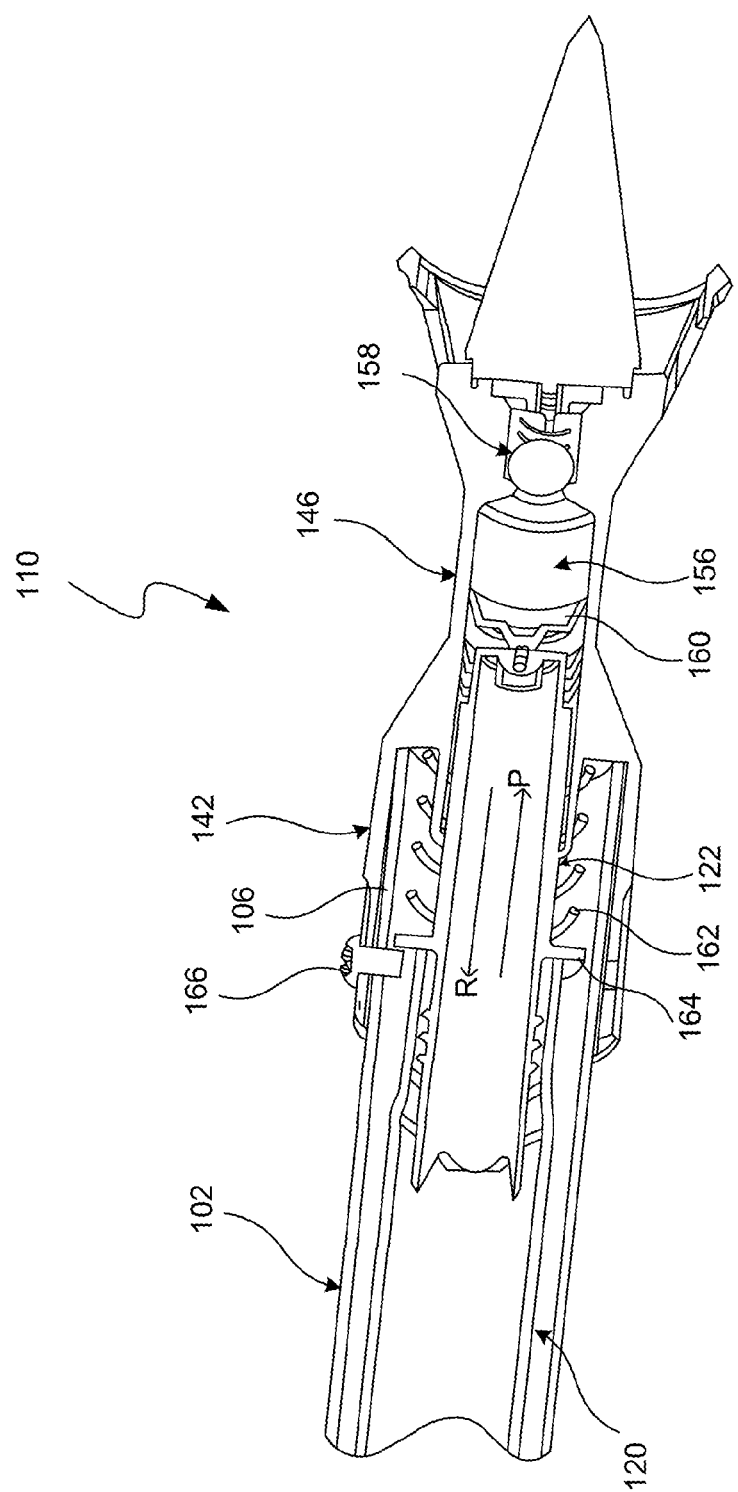
FIG. 6 is a partial side view in cross-section of the pump shown in FIG. 5.

Moving to FIG. 6, plunger 122 is positioned, in part in this exemplary embodiment, in pump chamber 156 of pump portion 146. As shown, plunger 122 may extend into fitting portion 142. Plunger 122 includes a plunger valve 160 attached to the plunger 122 and disposed in pump chamber 156. Plunger valve 160 is operative to seal against a face of plunger 122 when moving in the pumping direction P and is operative to uncover a supply opening in plunger 122 when moving in a recharge direction R. Accordingly, when a user depresses reservoir cap 116, plunger 122 moves in the pumping direction P, thereby closing plunger valve 160 and forcing liquid in chamber 156 through check valve 158. Plunger 122 includes a spring flange 164 against which a return spring 162 presses, thereby urging the plunger 122 in the recharge direction R. Therefore, when a user releases reservoir cap 116, plunger 122 moves in the recharge direction R, opening plunger valve 160 to allow fluid from reservoir 120 to recharge the pump chamber 156 with another quantity of liquid. Fastener 166 is operative to attach main tube 102 to fitting portion 142 and may also provide a back stop to retain plunger 122 in pump chamber 156 by abutting spring flange 164.

Figure 7A:
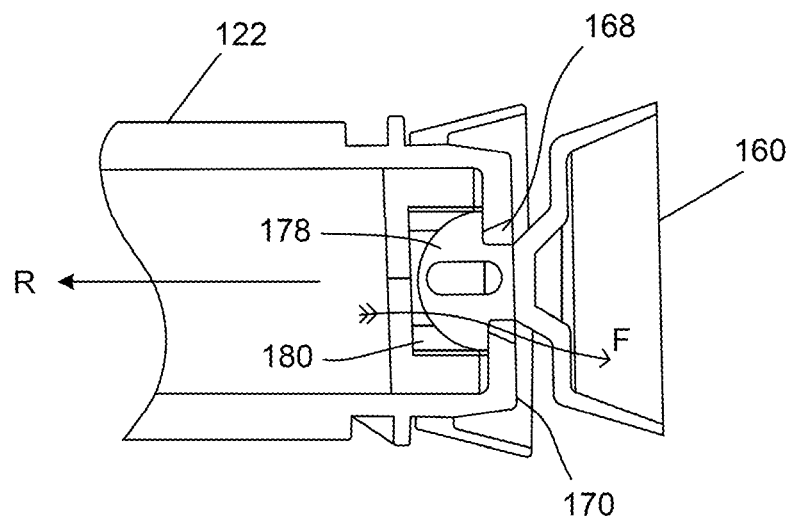
FIG. 7A is a partial side view and cross-section of the plunger valve in the recharge position.
Figure 7B:
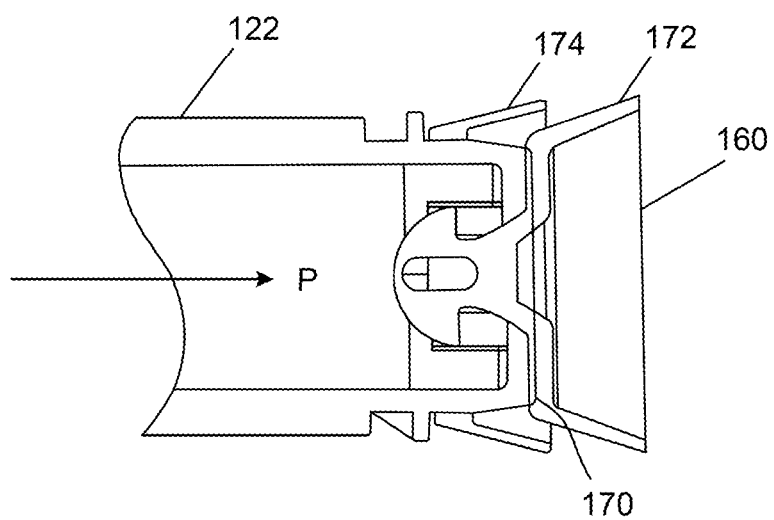
FIG. 7B is a partial side view and cross-section of the plunger valve in the pumping position.
Figure 8:
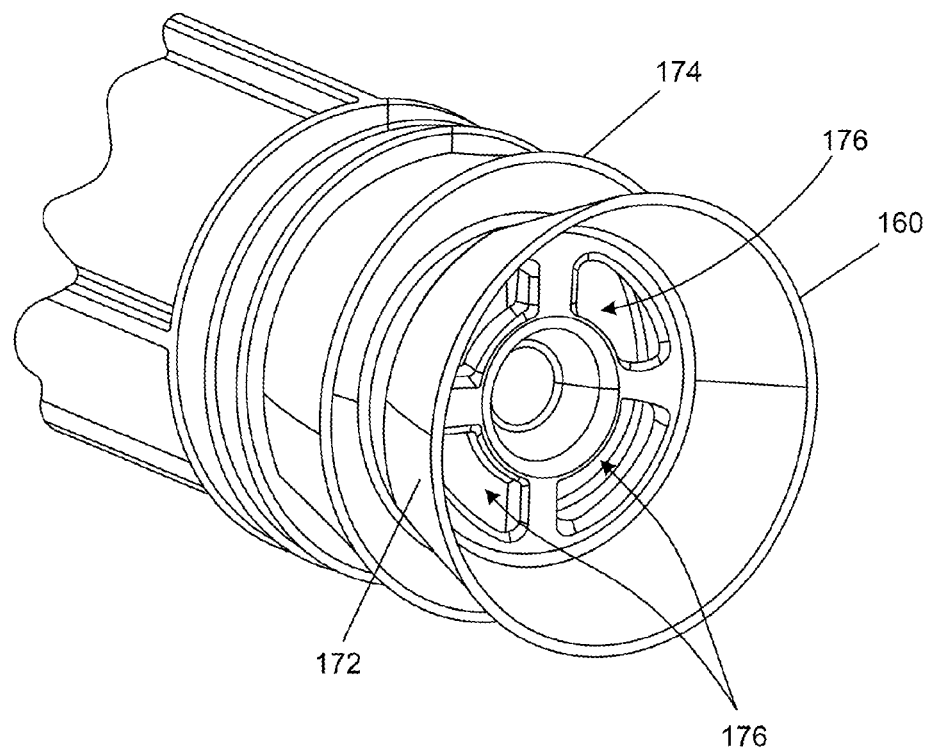
FIG. 8 is a partial perspective view of the plunger valve.

FIGS. 7A and 7B illustrate the movement of plunger valve 160 between the open and closed positions, respectively. As shown in FIG. 7A, the plunger 122 is moving in the recharge direction R, whereby suction created in pump chamber 156 pulls plunger valve 160 away from seal face 170, allowing fluid flow F to flow through opening 168. Plunger valve 160 is retained on plunger 122 by a button 178 that rides in a notched annular boss 180. FIG. 7B illustrates plunger 122 moving in the pumping direction P. As plunger 122 is moved in the pumping direction P, pressure is developed in pump chamber 156 which forces plunger valve 160 against seal face 170, thereby preventing any flow through opening 168 from the pump chamber 156. As can be appreciated in FIG. 7B, plunger valve 160 includes a cup seal 172 to seal against the walls of pump chamber 156. Plunger 122 also includes a primary cup seal 174 to contain the liquid in the pump chamber 156 during the recharge phase. As shown in FIG. 8, plunger valve 160 includes a plurality of apertures 176 which allow the fluid flow from opening 168 to flow past cup seal 172 and into pump chamber 156.

Figure 9:
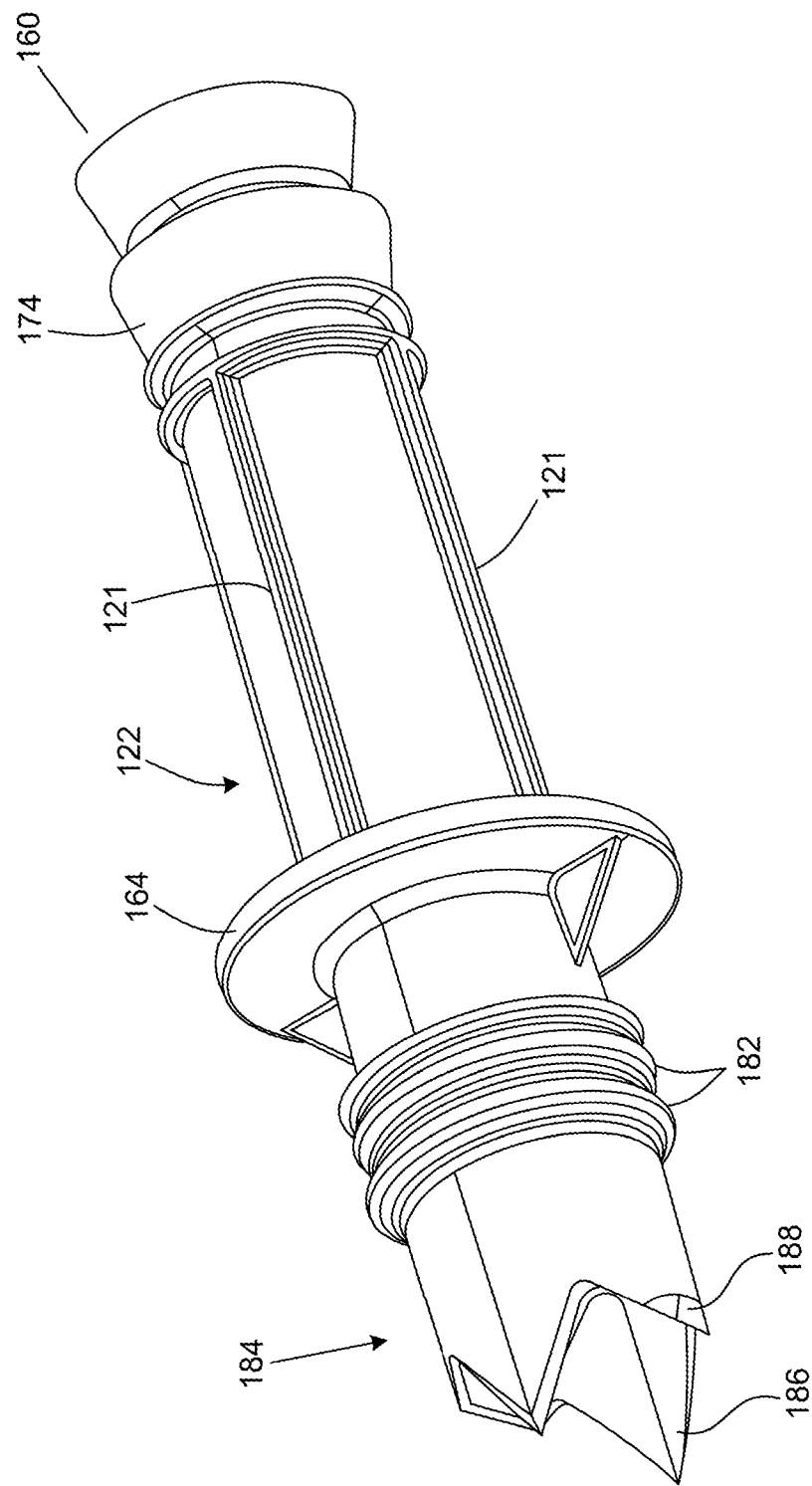
FIG. 9 is a perspective view of the plunger.

As shown in FIG. 9, plunger 122 includes a connector portion 184 having a pair of O-ring seals 182 for sealing against the interior of reservoir 120. Plunger 122 includes a plurality of axially extending ribs 121 to axially align the plunger 122 within the pump chamber 156. In some embodiments, connector portion 184 can also include sharps 186 and 188. In some embodiments, reservoir 120 is a refillable reservoir that can be refilled by removing reservoir cap 116 (see FIG. 2). In other embodiments, reservoir 120 is a replaceable cartridge having a frangible seal disposed in or on a distal end portion of the reservoir. Accordingly, the sharps 186 and 188 are operative to pierce the frangible seal as the connector portion 184 is inserted into the distal end portion of the reservoir cartridge. In another embodiment, the cartridge can include a flexible liner (e.g., a bag) on the inside of the cartridge. In this embodiment, the system is sealed, yet the liner is able to collapse on itself as fluid is pumped out, thereby accounting for any vacuum created within the cartridge as the fluid is pumped out. Such an embodiment would allow the device to operate underwater for controlling invasive underwater weeds and/or coral, for example.

Figure 10:
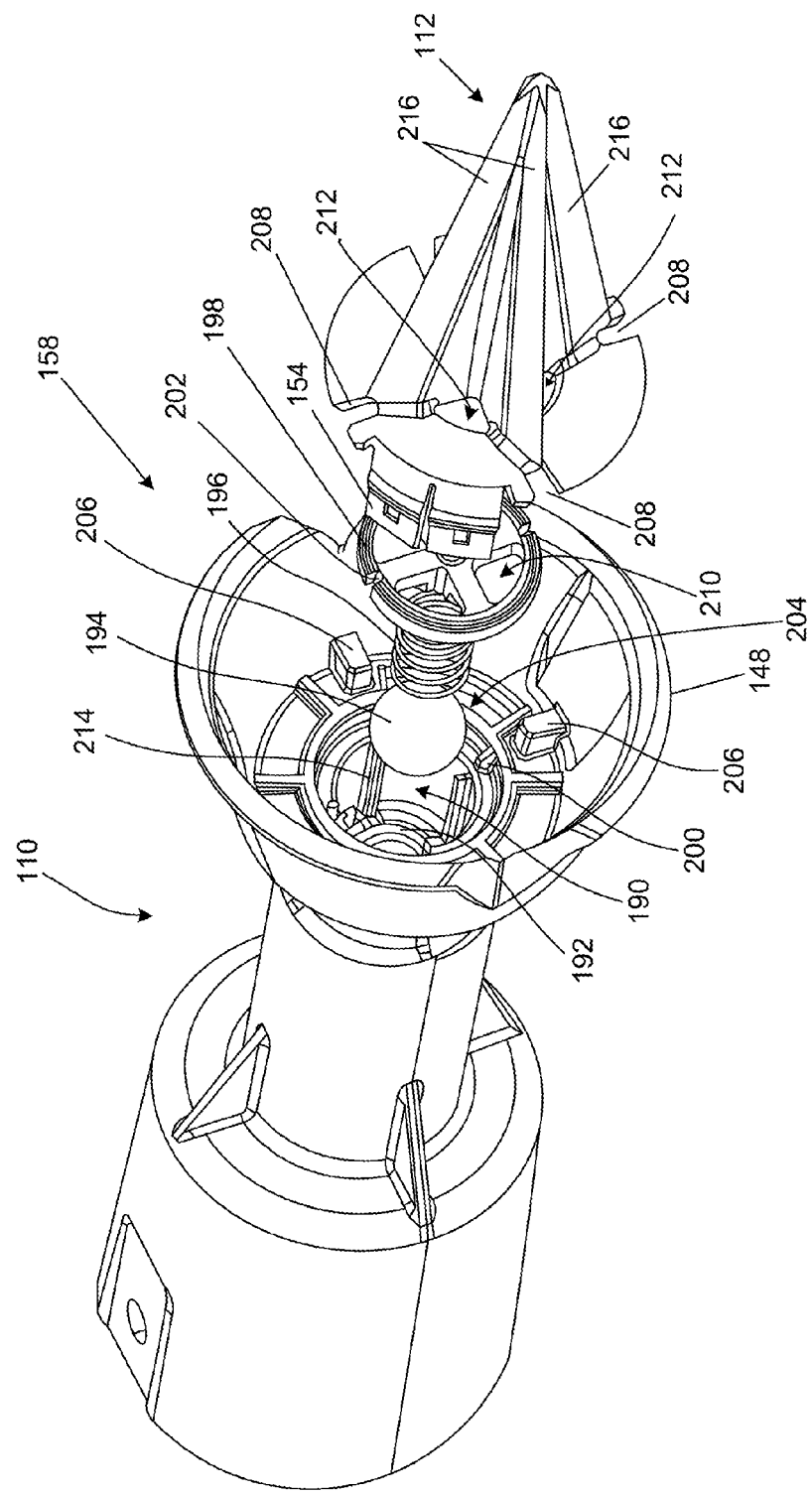
FIG. 10 is an exploded partial perspective view of the check valve assembly.

As shown in FIG. 10, pump housing 110 includes a check valve cavity 190 containing check ball 194, check valve spring 196, and check valve retainer 198. Check valve cavity 190 includes a plurality of ribs 214 to guide check ball 194. Check ball 194 is seated against check valve seat 192 by check valve spring 196. As pressure in pump chamber 156 increases during movement of the plunger 122 in the pumping direction P, check ball 194 overcomes the spring force of check valve spring 196 and lifts away from check valve seat 192, thereby allowing liquid to dispense through the check valve 158.

Check valve retainer 198 includes a plurality of apertures 210 for dispensing the liquid. Check valve retainer 198 also includes a pair of notches 202 that index with tabs 200 formed adjacent the check valve cavity 190. Check valve retainer 198 is held in place by spike 112 which is assembled against check valve retainer 198. Spike 112 includes a plurality of latches 154 that are inserted into openings 204 formed in the pump housing 110. Spike 112 includes a plurality of orifices 212 that align with apertures 210. Spike 112 also includes a plurality of notches 208 that index to tabs 206 formed around the interior of stand-off 148. Thus, the orifices 212 and the apertures 210 are indexed with respect to each other for proper alignment. It can now be appreciated that stand-off 148 functions to prevent the liquid delivery device 100 from being forced against the ground such that orifices 212 and apertures 210 are clogged, thereby fouling the check valve 158.

Spike 112 includes a plurality of blades 216 as shown in the figure. In this embodiment, spike 112 includes four blades 216; however, in other embodiments, the spike 112 may include more or fewer blades. Furthermore, any suitable spike configuration may be used. Also, while shown as a monolithic or unitary member with four blades 216 coupled together, each blade 216 could be a separate member or piece.

Other spike configurations and implements can be used with the disclosed liquid delivery device. For example, additional representative embodiments of spikes and implements are shown in FIGS. 11-22.

Figure 11:
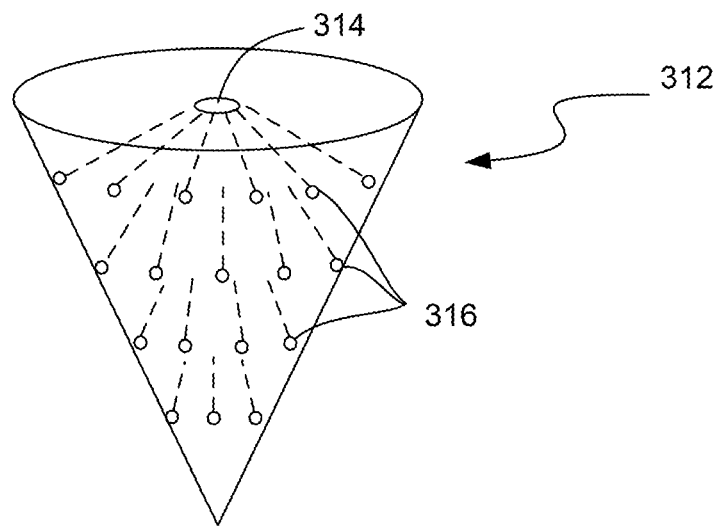
FIGS. 11-22 are perspective views of various representative embodiments of spikes and implements for use with the disclosed liquid delivery devices.

FIG. 11 illustrates a frustoconical spike 312 including an axial fluid delivery passage 314 and a plurality of distribution passages 316 extending radially from the axial fluid delivery passage 314. The frustoconical spike 312 can be pushed into the ground or into a plant for fluid dispensing.

Figure 12:
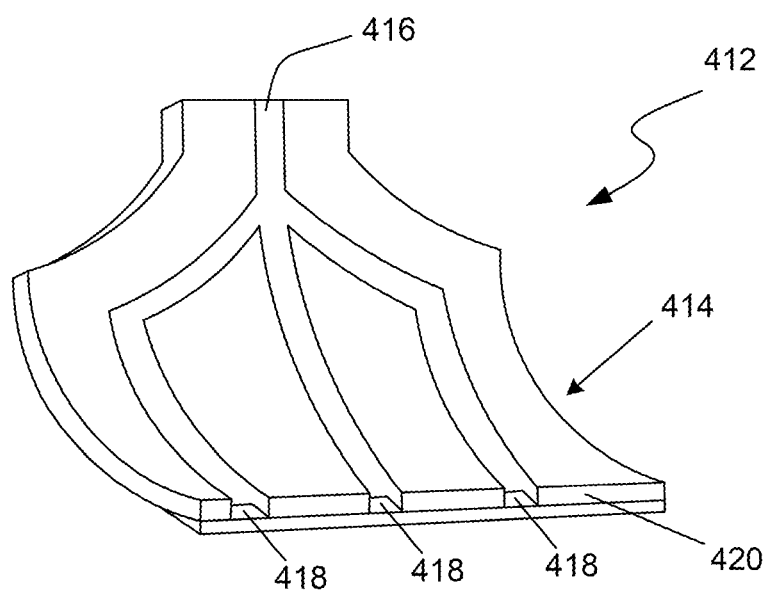

FIG. 12 illustrates a shovel implement 412. Shovel implement 412 includes a scoop shaped portion 414 having a plurality of distribution channels 418 that extend from a central feed channel 416. The dispensed fluid flows along the channels 416, 418 to edge 420 where the fluid can be directed into cracks, corners, crevices, and the like.

Figure 13:
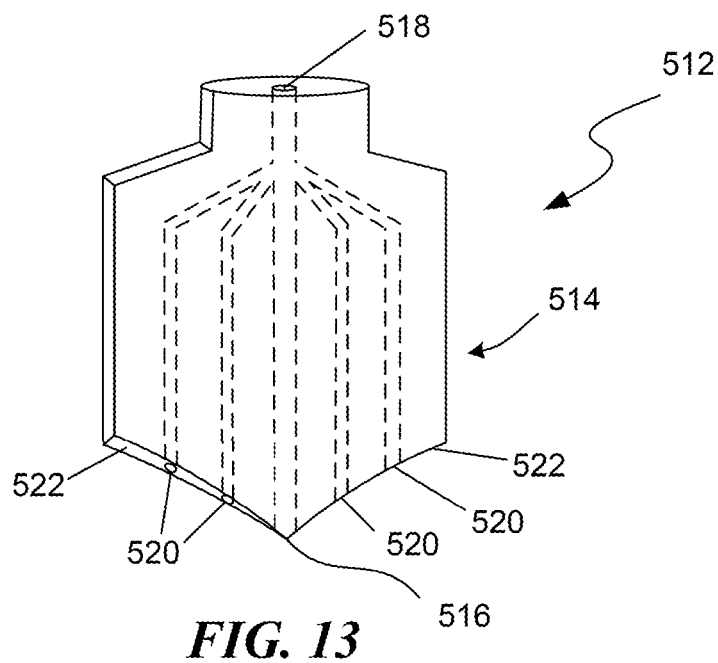

FIG. 13 illustrates a pointed spade implement 512. The spade 512 includes a flat blade portion 514 with a pointed tip 516. A plurality of distribution passages 520 extend from a central fluid delivery passage 518 and exit the blade portion 514 along edges 522. The pointed spade implement 512 can be used along edging and cracks, for example.

Figure 14:
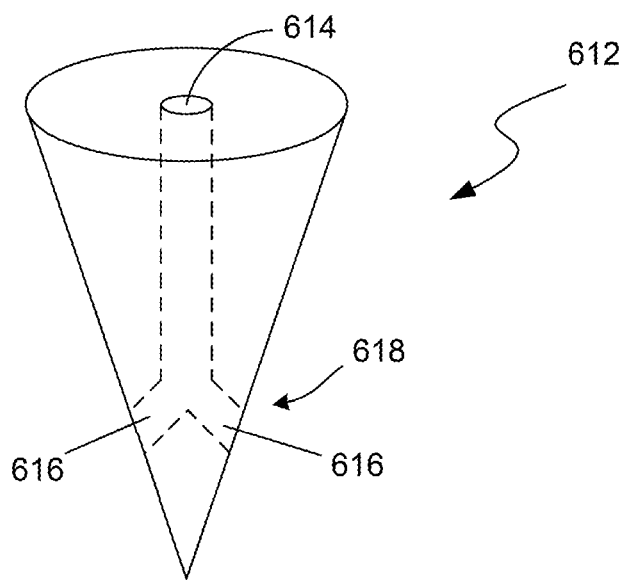

FIG. 14 illustrates a frustoconical spike 612 including an axial fluid delivery passage 614 and a pair of distribution passages 616 extending from the axial fluid delivery passage 614 and exiting at a distal end portion 618 of the frustoconical spike. The frustoconical spike 612 can be pushed into the ground or into a plant for fluid dispensing.

Figure 15:
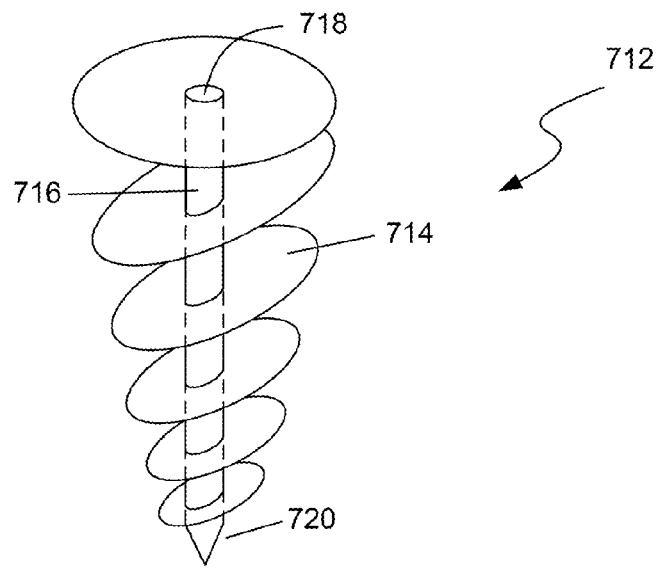

FIG. 15 illustrates an auger implement 712 having a helical bit 714 disposed around a hollow shaft 716. Shaft 716 includes a central fluid delivery passage 718 that exits at or near the tip 720 of the auger implement 712. In some embodiments, the auger implement 712 is fixedly attached to the pump housing 110 so that the auger implement 712 can be screwed into the ground by rotating the handle 108. In other embodiments, the auger implement 712 is rotatably attached to the pump housing 110, such that the helical bit screws itself into the ground when the handle 108 is pushed down with sufficient force. Once the auger implement 712 is pushed/screwed into the ground or into a weed, liquid can be dispensed into the weed's roots via exit 720. Thereafter, the auger implement 712 can be pulled out of the ground to damage and/or remove the weed.

Figure 16:
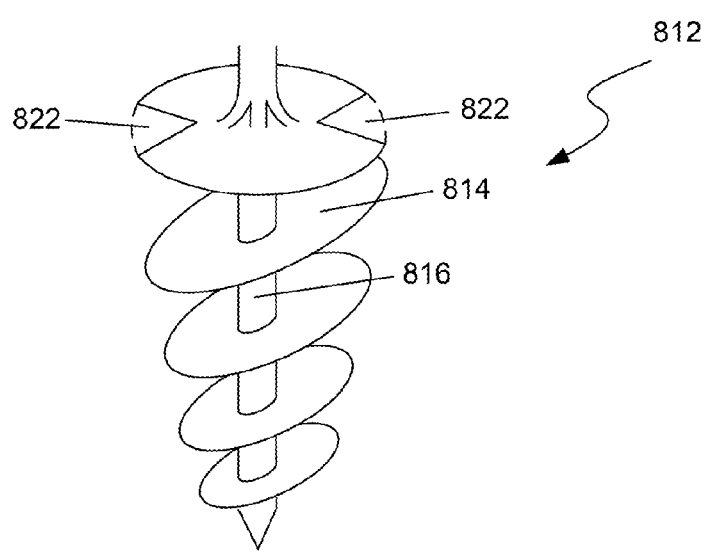

FIG. 16 illustrates an auger implement 812 that is similar to auger implement 712 discussed above. In this embodiment, however, the helical bit 814 is disposed around a solid shaft 816 and the helical bit 814 includes one or more reliefs 822 to allow fluid to wick down the helical bit 814.

Figure 17:
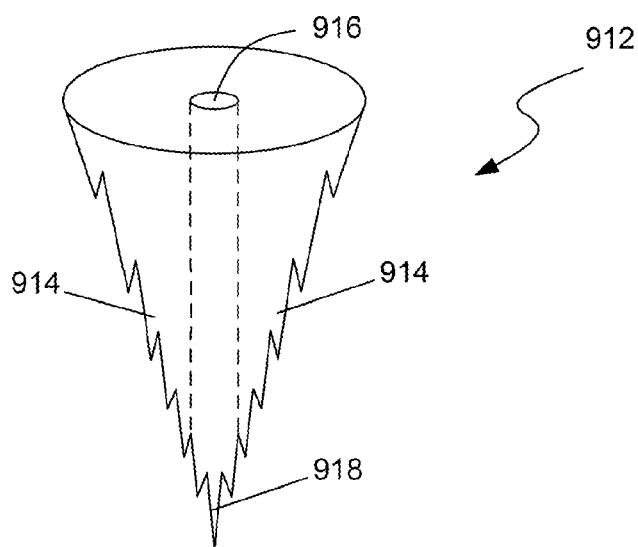

FIG. 17 illustrates a generally frustoconical spike 912 that has jagged edges 914 to facilitate damaging a weed's roots and leaves. The spike 912 includes a central fluid passageway 916 exiting the spike at a tip portion 918.

Figure 18:
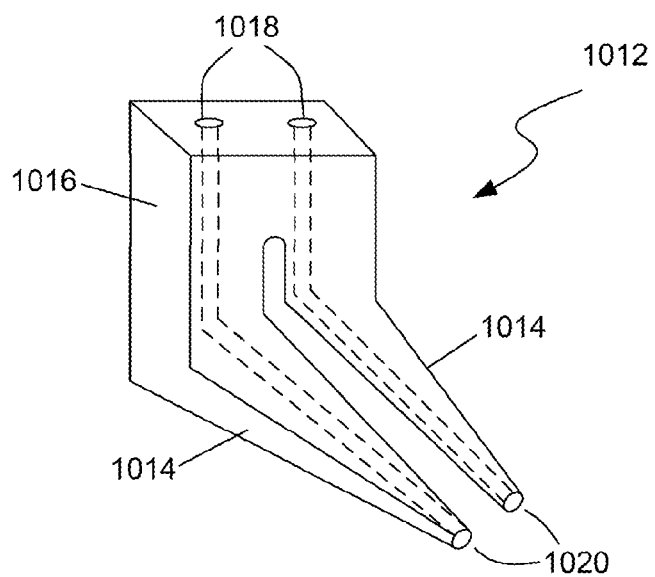

FIG. 18 illustrates a fork implement 1012 including a base portion 1016 with a pair of prongs 1014 extending from the base portion 1016 at an angle. Each prong 1014 includes a fluid delivery passageway 1018. The prongs 1014 can be used to pry up weed roots. In addition, fluid can be dispensed onto the weed and roots through the fluid delivery passageways 1018.

Figure 19:
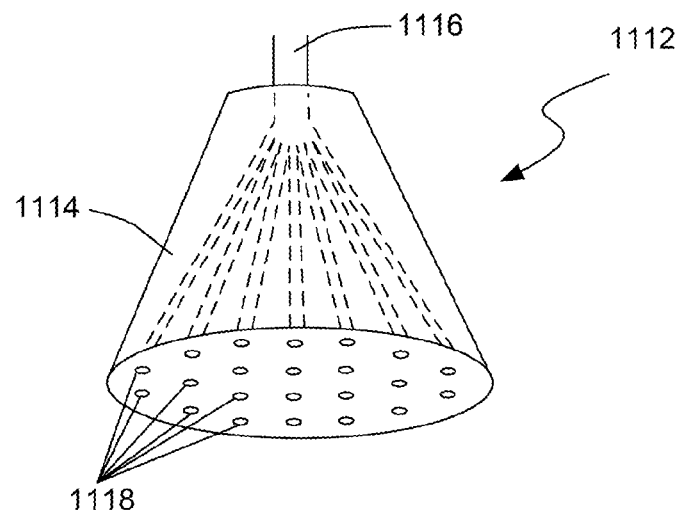

FIG. 19 illustrates a sprayer implement 1112. Sprayer implement 1112 includes a sprayer body 1114 with a plurality of misting tunnels 1118 extending from a central delivery passageway 1116. The sprayer implement 1112 is operative to deliver the dispensed fluid in the form of a mist. Thus, the fluid can be sprayed onto target plants or weeds.

Figure 20:
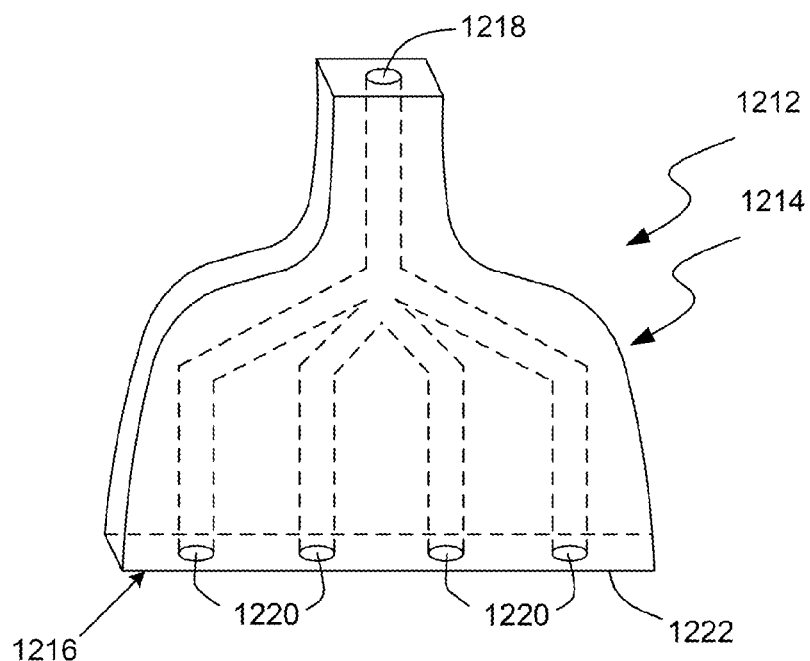

FIG. 20 illustrates a straight spade implement 1212 similar to the pointed spade implement 512 discussed above with respect to FIG. 13. The straight spade 1212 includes a flat blade portion 1214 with a straight tip 1216. A plurality of distribution passages 1220 extend from a central fluid delivery passage 1218 and exit the blade portion 1214 along edge 1222. The straight spade implement 1212 can be used along edging and cracks, for example. In some embodiments the tip 1216 is sized to fit in the seams of a sidewalk or driveway. In some embodiments, the distribution passages 1220 are sized to deliver the fluid as a mist. In other embodiments, the distribution passages are sized to deliver the fluid in a stream.

Figure 21:
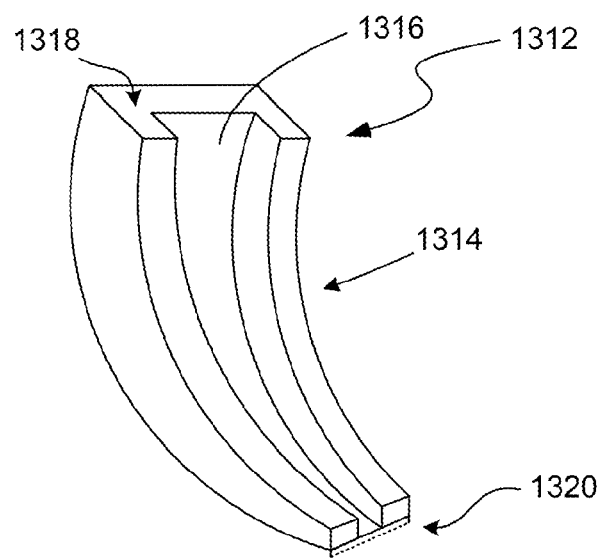
Figure 22:
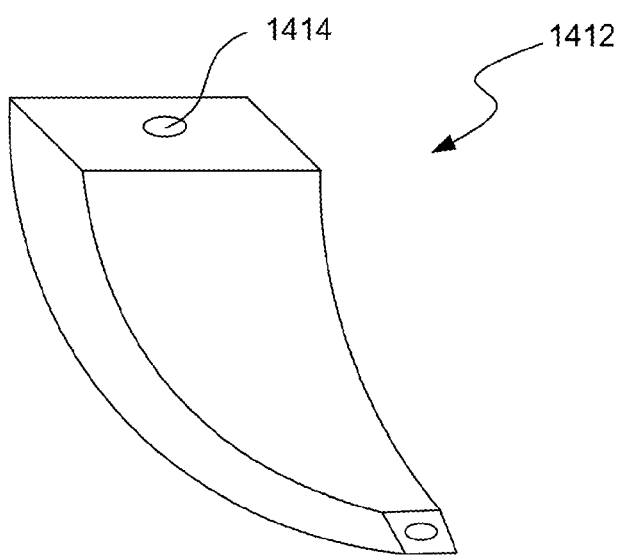

FIG. 21 illustrates a finger implement 1312 with a curved body 1314. Curved body 1314 includes a delivery channel 1316 that tapers from a larger end portion 1318 to a narrower end portion 1320. Accordingly, the finger implement 1312 can be used in corners and other tight spaces. FIG. 22 illustrates a finger implement 1412, similar to finger implement 1312 except the fluid is delivered through an internal delivery passageway 1414.

Although the embodiments are described with respect to dispensing an herbicide, other liquids can be dispensed with the disclosed technology. For example, liquid delivery device 100 can be used to dispense liquid fertilizer, nutrients, pesticides, vaccinations/inoculations, medications, and genetic injections ("biopharming"). Liquid delivery device 100 can also be used for pollination and selective watering. In some cases, it is desirable to target a particular plant with fertilizer. For example, trees benefit from targeted application of fertilizer. Thus, the disclosed liquid delivery device 100 can be used to disrupt the soil around the drip line of a tree and to dispense liquid fertilizer directly into the ground surrounding the tree.

The components of the liquid delivery device 100 can be comprised of any suitable materials based on strength, cost, ease of manufacture, and chemical (e.g., herbicide or fertilizer) resistance, where necessary. For example, in some embodiments, the main tube 102, reservoir 120, handle 108, reservoir cap 116, pump housing 110, and plunger 122 can be comprised of any suitable plastic, such as for example and without limitation, Polypropylene (PP), High Density Polyethylene (HDPE), Polytetrafluoroethylene (PTFE), Polyethylene (PE), acetal homopolymer resin (e.g., Delrin®), polyimide (e.g., Vesper®), nylon, engineered plastics, and fiber or glass filled plastics. In some embodiments, vented cap liner 124 can be comprised of a PE foam, Teflon®, PTFE, Foil, or other suitable material. In some embodiments, plunger valve 160 and primary cup seal 174 can be comprised of PE, for example. In some embodiments, O-ring seals 182 and check ball 194 can be comprised of Neoprene, Buna-N, ethylene propylene diene monomer (EPDM), Silicone, Flourosilicone, rubber, or other suitable material. In some embodiments, check ball 194 can comprise metal, such as steel, brass, stainless steel, aluminum, or the like. In some embodiments, spike 112 can be comprised of PP, glass filled plastic, or any suitably durable material. In some embodiments, check valve spring 196 and return spring 162 can be comprised of stainless steel, spring steel, or other suitable material.

Although various materials are suggested above for the components of liquid delivery device 100, other materials may be used. For example, where plastic is specified, metal material may be used, and where metal is specified, plastic may be used.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A fluid delivery device, comprising:
a main tube;
a pump housing attached to the main tube and including a pump chamber;
a check valve including one or more dispensing orifices in fluid communication with the pump chamber;
a reservoir disposed at least partially within the main tube for reciprocating movement therein, wherein the reservoir is a replaceable cartridge including a plunger opening and a frangible seal positioned proximate the plunger opening; and
a plunger connected to the reservoir and positioned in the pump chamber, the plunger including a connector end having a protrusion operative to breech the frangible seal when the connector end is inserted into the plunger opening for connection to the reservoir, the plunger being operative to push a fluid contained in the pump chamber through the check valve and the one or more dispensing orifices upon reciprocating movement of the reservoir.

2. The fluid delivery device of claim 1, wherein the pump housing extends along an elongate axis and further comprises a spike extending axially from the pump housing.

3. The fluid delivery device of claim 2, further comprising a stand-off extending from the pump housing and positioned to space the one or more dispensing orifices from a surface.

4. The fluid delivery device of claim 3, wherein the stand-off comprises an annular ring.

5. The fluid delivery device of claim 4, wherein the annular ring includes one or more notches having at least one sharp edge capable of cutting leaves of a weed.

6. The fluid delivery device of claim 1, further comprising a stand-off extending from the pump housing and positioned to space the one or more dispensing orifices from a surface.

7. The fluid delivery device of claim 1, wherein the pump housing includes a check valve cavity, and the check valve comprises a check ball and a check ball spring contained in the check valve cavity.

8. The fluid delivery device of claim 7, further comprising a check valve retainer attached to the pump housing adjacent the check valve cavity and including the one or more dispensing orifices.

9. A fluid delivery device, comprising:
a main tube;
a reservoir containing a fluid disposed at least partially within the main tube, wherein the reservoir is a replaceable cartridge including a plunger opening and a frangible seal positioned proximate the plunger opening;
a pump attached to the main tube, including:
a pump housing extending along an axis and including a pump chamber;
a plunger connected to the reservoir and positioned in the pump chamber, the plunger including a connector end having a protrusion operative to breech the frangible seal when the connector end is inserted into the plunger opening for connection to the reservoir, wherein the plunger is slidable along a longitudinal axis of the pump in a pumping direction and a recharge direction;
a plunger valve connected to the plunger wherein the plunger valve is operative to seal against a face of the plunger when moving in the pumping direction and operative to uncover a supply opening when moving in the recharge direction placing the reservoir and the pump chamber in fluid communication and filling the pump chamber with the fluid from the reservoir; and
a check valve downstream of the pump chamber and in fluid communication with the pump chamber;
wherein movement of the plunger forces the fluid contained in the pump chamber through the check valve; and
a spike extending axially from the pump housing, wherein the spike comprises at least one orifice in fluid communication with the check valve operative to distribute the fluid.

10. The fluid delivery device of claim 9, wherein the reservoir reciprocates along with the plunger between a pumping direction and a recharge direction.

11. The fluid delivery device of claim 9, further comprising a stand-off extending from the pump housing and positioned to space the check valve from a surface.

12. The fluid delivery device of claim 9, wherein the reservoir includes a removable cap to facilitate refilling the reservoir.

13. A liquid delivery device, comprising:
a main tube having proximal and distal end portions;
a handle disposed on the proximal end portion of the main tube;
a reservoir disposed at least partially within the main tube, wherein the reservoir is a replaceable cartridge including a plunger opening and a frangible seal positioned proximate the plunger opening;
a pump attached to the distal end portion of the main tube, including:
a pump housing including a pump chamber;
a plunger for reciprocating movement connected to a first end of the reservoir and positioned in the pump chamber, the plunger including a connector end having a protrusion operative to breech the frangible seal when the connector end is inserted into the plunger opening for connection to the reservoir; and
a check valve in fluid communication with the pump chamber;
wherein movement of the plunger pushes a liquid contained in the pump chamber through the check valve;
a spike extending from the pump housing containing at least one orifice in fluid communication with a discharge of the check valve; and
a stand-off extending from the pump housing and positioned adjacent the spike.

14. The liquid delivery device of claim 13, wherein the reservoir reciprocates with the plunger and a second end of the reservoir extends beyond the proximal end portion of the main tube, whereby a user can move the reservoir and the plunger in a pumping direction by pushing on the second end of the reservoir.

15. The liquid delivery device of claim 14, further comprising a return spring positioned between the plunger and the pump housing, operative to urge the plunger and the reservoir in a recharge direction.

16. The liquid delivery device of claim 15, further comprising a plunger valve connected to the plunger, wherein the plunger valve is operative to seal against a face of the plunger when moving in the pumping direction and operative to uncover a supply opening when moving in the recharge direction, thereby filling the pump chamber with the liquid from the reservoir.

17. The liquid delivery device of claim 13, wherein the stand-off comprises an annular ring.

18. The liquid delivery device of claim 17, wherein the annular ring includes one or more notches having at least one sharp edge capable of cutting leaves of a weed.

* * * * *